(12) United States Patent
Kwak et al.

(10) Patent No.: US 6,891,560 B2
(45) Date of Patent: May 10, 2005

(54) METHOD OF REDUCING CONSUMPTION OF DEVELOPER USED IN ELECTROPHOTOGRAPHIC PROCESSOR, AND ELECTROPHOTOGRAPHIC PROCESSOR PERFORMING THE METHOD

(75) Inventors: In-gu Kwak, Gyeonggi do (KR); Suk-gyun Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/652,618

(22) Filed: Sep. 2, 2003

(65) Prior Publication Data

US 2004/0120748 A1 Jun. 24, 2004

(30) Foreign Application Priority Data

Aug. 30, 2002 (KR) .................. 10-2002-0051878

(51) Int. Cl.$^7$ .......................... G03R 15/00; G03G 15/00
(52) U.S. Cl. ........................ 347/246; 399/27; 399/38; 399/49; 399/53
(58) Field of Search .................. 347/131, 133, 347/135, 246, 247; 399/27, 44, 46, 47, 48, 49, 53, 38; 372/29.011, 29.012, 38.1

(56) References Cited

U.S. PATENT DOCUMENTS

| | | | |
|---|---|---|---|
| 4,144,539 A | | 3/1979 | Davie et al. |
| 4,727,382 A | * | 2/1988 | Negishi et al. .............. 347/246 |
| 4,803,497 A | | 2/1989 | Kennedy, Jr. et al. |
| 4,812,861 A | | 3/1989 | Sasaki et al. |
| 5,258,780 A | * | 11/1993 | Ema et al. ................... 347/131 |
| 5,347,298 A | * | 9/1994 | Gokita ........................ 347/133 |
| 5,418,806 A | * | 5/1995 | Araki ..................... 372/29.015 |
| 5,473,153 A | * | 12/1995 | Araki et al. ................. 250/205 |
| 5,504,557 A | * | 4/1996 | Morita ......................... 399/56 |
| 5,550,573 A | * | 8/1996 | Serizawa et al. ........... 347/246 |
| 5,677,723 A | * | 10/1997 | Soya et al. ................. 347/247 |
| 5,752,126 A | * | 5/1998 | Muramatsu ................... 399/44 |
| 5,859,659 A | * | 1/1999 | Araki et al. ................ 347/246 |
| 5,973,719 A | * | 10/1999 | Araki et al. ................ 347/253 |
| 6,122,075 A | * | 9/2000 | Yamada et al. ............. 358/446 |
| 6,370,175 B1 | * | 4/2002 | Ikeda et al. ................ 372/38.1 |
| 6,404,997 B1 | * | 6/2002 | Grace .......................... 399/27 |
| 6,466,594 B1 | * | 10/2002 | Iwazaki ................... 372/29.01 |
| 6,483,997 B1 | * | 11/2002 | Nakazato ..................... 399/46 |
| 6,529,694 B1 | * | 3/2003 | Fukaya et al. ................ 399/46 |
| 6,553,191 B1 | * | 4/2003 | Nakane ....................... 399/38 |
| 6,738,586 B2 | * | 5/2004 | Kubota et al. ................ 399/48 |

FOREIGN PATENT DOCUMENTS

DE 39 39 309 5/1990

\* cited by examiner

Primary Examiner—Eugene H. Eickholt

(57) ABSTRACT

A method of reducing consumption of a developer used in an electrophotographic processor that forms a latent electrostatic image on a charged photosensitive object using a laser exposure unit for outputting a laser beam, the method including adjusting a power of the laser beam to match a user-selected density of an output image so as to adjust an electric potential between an image region and a non-image region of the latent electrostatic image, wherein the consumption of the developer is reduced, and an electrophotographic processor performing the method.

11 Claims, 4 Drawing Sheets

METHOD OF REDUCING CONSUMPTION OF DEVELOPER USED IN ELECTROPHOTOGRAPHIC PROCESSOR, AND ELECTROPHOTOGRAPHIC PROCESSOR PERFORMING THE METHOD

CROSS-REFERENCE TO RELATED APPLICATIONS

This application claims the priority of Korean Patent Application No. 2002-51878, filed Aug. 30, 2002 in the Korean Intellectual Property Office (KIPO), which is incorporated herein in its entirety by reference.

BACKGROUND OF THE INVENTION

1. Field of the Invention

The present invention relates to an electrophotographic processor using a laser beam scanning unit (LSU) as an optical source, and, more particularly, to a method of reducing consumption of a developer used in an electrophotographic processor by adjusting the power of a laser beam to correspond to a set density of an output image.

2. Description of the Related Art

FIG. 1 is a diagram of a general electrophotographic processor including a charging unit 10, a laser exposure unit 20, a photosensitive object 30, a developing unit 40, and a transferring unit 50.

The photosensitive object 30 is charged with electricity by the application of a high negative voltage by the charging unit 10. An exposure process is performed on the photosensitive object 30 using a laser beam emitted from the laser exposure unit 20 in order to form a latent electrostatic image thereon. The developing unit 40 adheres a developing solution to the latent electrostatic image formed on the photosensitive object 30 to form a visual image on the photosensitive object 30. The transferring unit 50 transfers the visual image formed on the photosensitive object 30 to paper S.

There are various methods of reducing consumption of a developer in the above electrophotographic processor. These methods are: (i) modulating a pulse width to reduce the pulse width of a print data signal; (ii) reducing a developing bias voltage applied to the developing unit so as to apply less developer; and (iii) lightly outputting an image using a dithering technique.

However, method (i) of reducing a pulse width of print data increases a radiation rate of an electromagnetic interference (EMI) of an electrophotographic processor, method (ii) of reducing a developing bias voltage pollutes a non-image region of an output image with a developer, and method (iii) of using the dithering technique lowers the resolution of an output image.

SUMMARY OF THE INVENTION

The present invention provides a method of reducing consumption of a developer in an electrophotographic processor by adjusting the power of a laser beam to solve the above and/or other problems of the conventional methods of saving developer.

The present invention also provides an electrophotographic processor performing such a method.

Additional aspects and/or advantages of the invention will be set forth in part in the description which follows and, in part, will be obvious from the description, or may be learned by practice of the invention.

According to one aspect of the present invention, there is provided a method of reducing consumption of a developer used in an electrophotographic processor that forms a latent electrostatic image on a charged photosensitive object using a laser exposure unit for outputting a laser beam, the method comprising adjusting a power of the laser beam to match a user-selected density of an output image so as to adjust an electric potential between an image region and a non-image region of the latent electrostatic image, wherein the consumption of the developer is reduced.

According to another aspect of the present invention, there is provided an electrophotographic processor that includes a laser exposure unit having a laser diode for radiating a laser beam based on print data, a photosensitive object onto which the laser beam is radiated to form a latent electrostatic image, a charging unit, a developing unit, and a transferring unit, the electrophotographic processor comprising: a key input unit manipulated by a user to output a density set signal of an image and a print instruction signal, and a laser beam power control unit controlling power of the radiated laser beam, through feedback of the power, in response to the print instruction signal and the density set signal.

BRIEF DESCRIPTION OF THE DRAWINGS

These and other aspects and/or advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
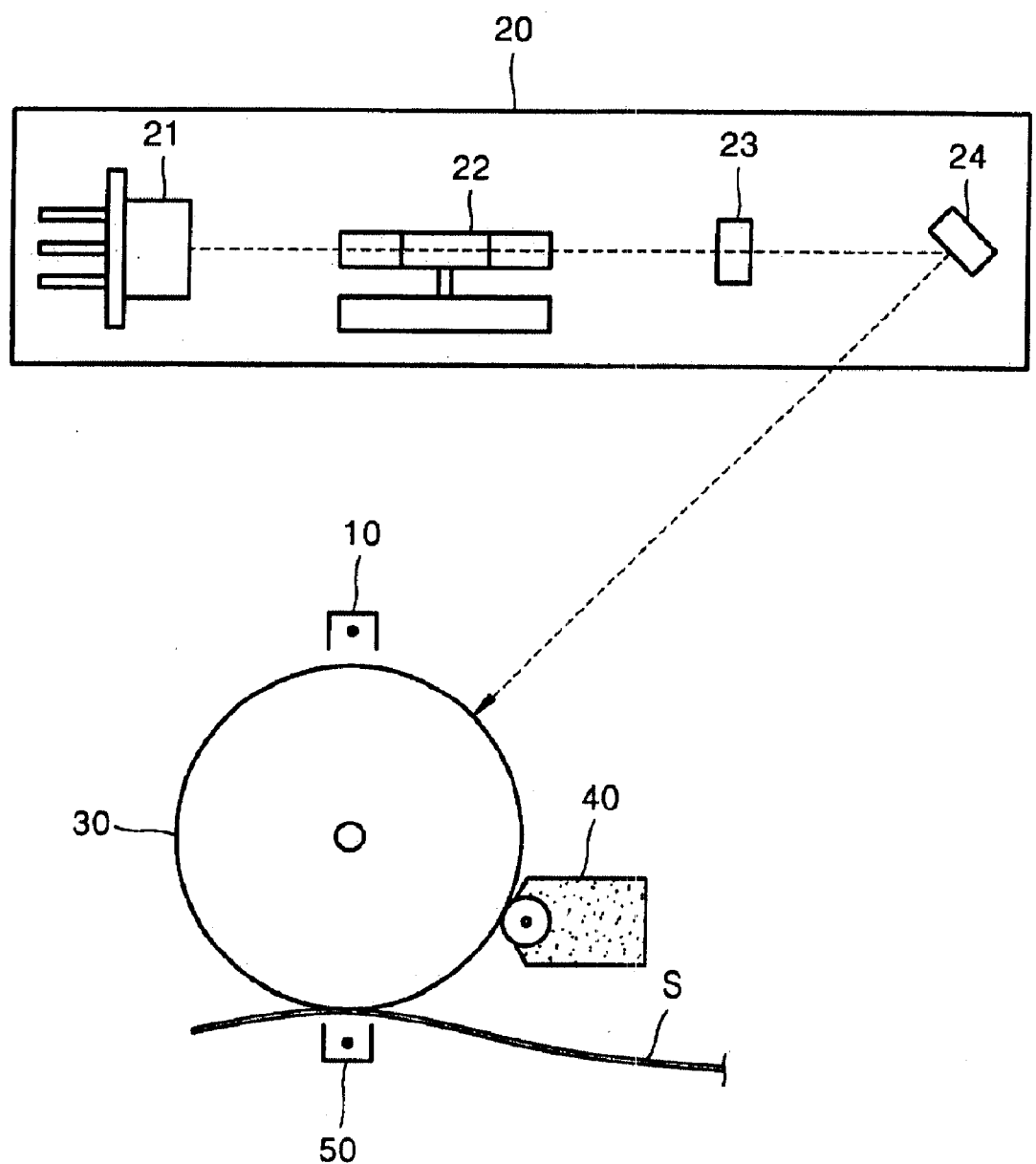
FIG. 1 is a diagram of a general electrophotographic processor.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

An exposure process, a developing process, and the power of a laser beam will now be briefly explained before describing a method of reducing consumption of a developer in an electrophotographic processor according to an embodiment of the present invention.

An exposure process is performed in an electrophotographic processor, using a laser exposure apparatus. In the exposure process, when a laser beam is radiated onto a charged photosensitive drum, a latent electrostatic image is formed on the photosensitive drum due to a difference in electric potential between an exposed region and a non-exposed region of the photosensitive drum. Radiation of a laser beam onto the photosensitive drum charged with a negative voltage (−), e.g., −800 V, results in a reduction in the electric potential at a region of the photosensitive drum exposed to the laser beam. In this case, the voltage of the exposed region becomes approximately 0 V, while the voltage of a non-exposed region is maintained at −800 V. The latent electrostatic image is formed due to this difference in electric potential between the exposed image region and the non-exposed image region.

A developing process is performed by a developing apparatus, in which a toner, which is a developer, is adhered to the latent electrostatic image on a photosensitive object to form a visual image thereon. In general, the density of the visual image is adjusted to make the image appear dimmer by reducing a developing bias voltage.

An adjustment in the power of the laser beam radiated onto the photosensitive object changes the size or depth of the image area of the latent electrostatic image, which is covered with a developer, thereby adjusting the density of the visual image. For instance, a reduction in the power of the laser beam results in a reduction in the size of an image region of the charged photosensitive object where the electric potential is to be reduced by irradiation by the laser beam. As a result, the electric potential of the irradiated region is not completely reduced to 0V. Accordingly, consumption of a developer applied onto the image region can be reduced. In contrast, an increase in the power of the laser beam results in an increase in the density of an image, and an increase in consumption of the developer.

Hereinafter, a method of reducing consumption of a developer used in an electrophotographic processor will be described with respect to the accompanying drawings.

Figure 2:
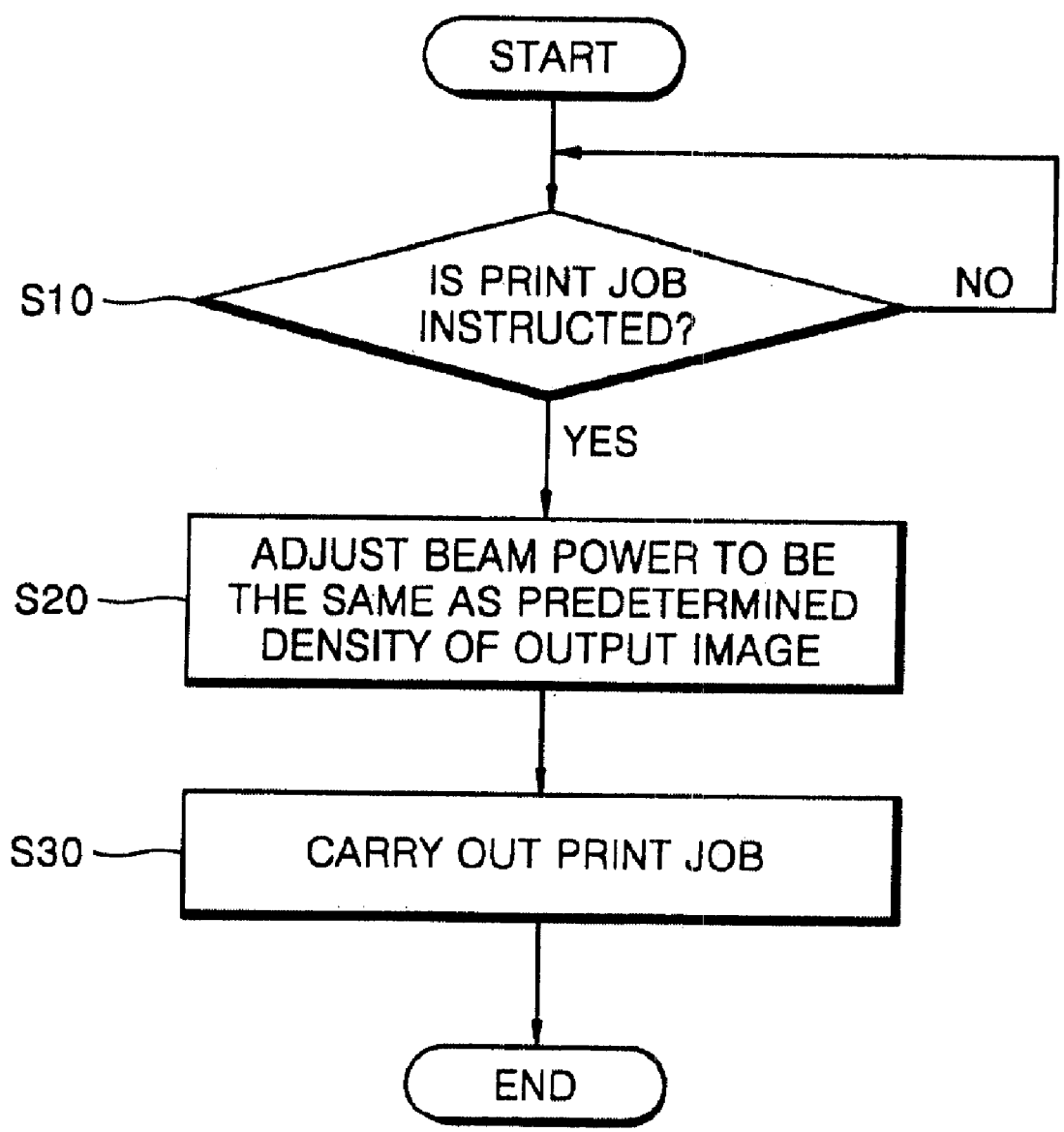
FIG. 2 is a flowchart illustrating a method of reducing consumption of a developer in an electrophotographic processor according to an embodiment of the present invention.

FIG. 2 is a flowchart illustrating a method of reducing consumption of a developer used in an electrophotographic processor according to an embodiment of the present invention. The method of FIG. 2 includes checking whether there is a print job to be performed (action S10), adjusting the power of a laser beam (action S20), and performing the print job (action S30).

More specifically, a check is continuously performed to determine whether there is a print job instructed by the outside in action S10. If it is determined that any print job is instructed, the power of the laser beam is adjusted, using automatic power control (APC), based on the density of an output image set in the electrophotographic processor, in action S20. The adjustment of the laser beam power using the APC is accomplished by converting the power of the laser beam into a voltage, and adjusting the voltage to approximate a reference voltage corresponding to a predetermined laser beam power.

Figure 3:
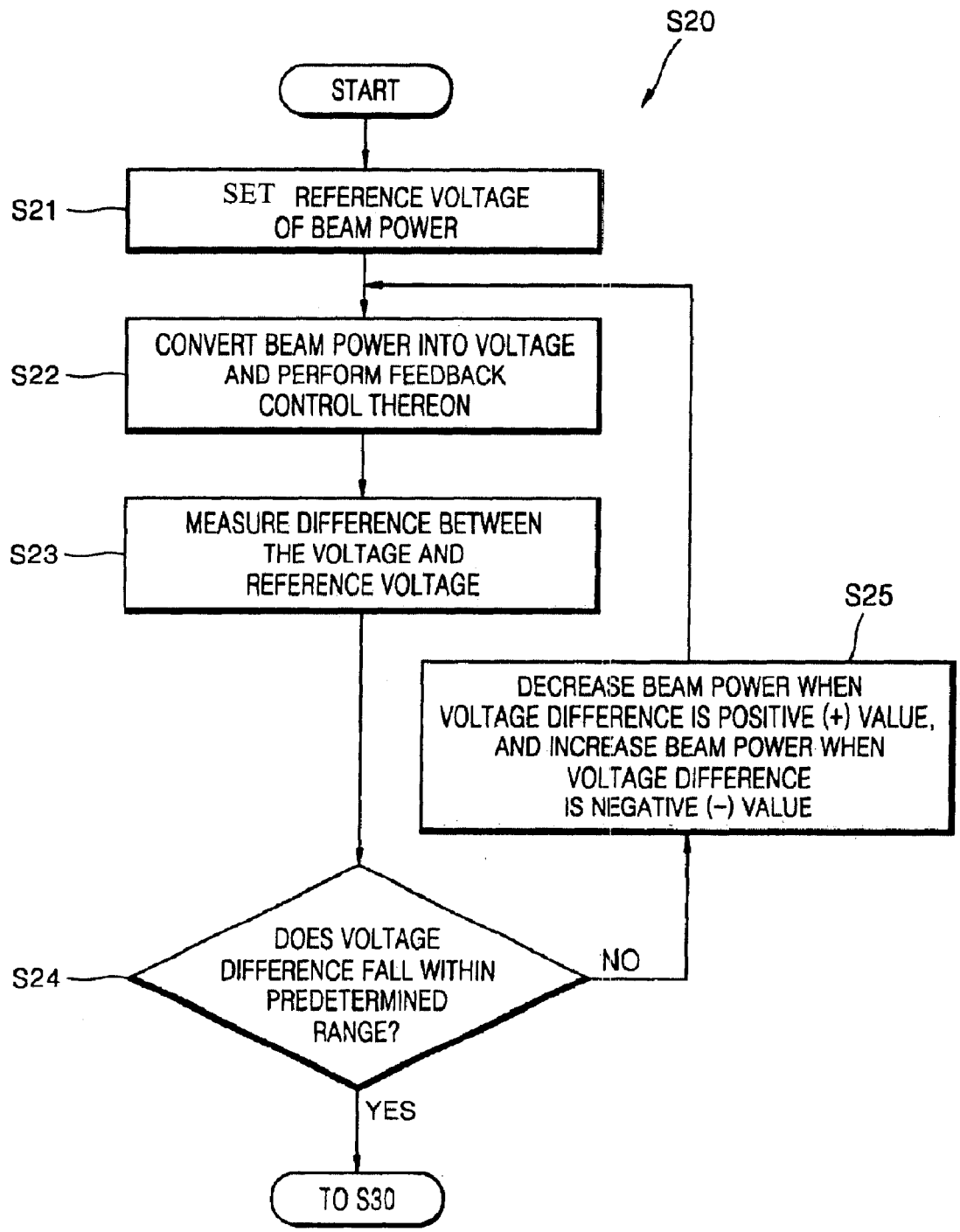
FIG. 3 is a flowchart illustrating an embodiment of action 20 of FIG. 2.

FIG. 3 is a flowchart illustrating an embodiment of action S20 of FIG. 2. According to this embodiment, action S20 includes setting a reference voltage corresponding to the predetermined power of the laser beam (action S21), feeding back the power of the laser beam (action S22), comparing the power of the laser beam with the reference voltage (action S23), checking the power of the laser beam (action S24), and adjusting the power of the laser beam (action S25).

In detail, the reference voltage is set to correspond to a predetermined density of an output image so as to perform feedback control on the power of the laser beam, in action S21.

Next, the power of the radiated laser beam is converted into a voltage and fed back, to be compared with the reference voltage, in action S22.

In action S23, the power of the laser beam, which is converted into a voltage, is compared with the reference voltage to measure a difference therebetween. According to an embodiment of action S23 according to the present invention, it is determined whether the power of the laser beam, which is converted into a voltage, is higher or lower than the reference voltage. According to another embodiment of action S23, a difference between the power of the laser beam, which is converted into a voltage, and the reference voltage is measured. Here, an analog-to-digital (A/D) converter may be used.

In action S24, it is determined whether the voltage difference measured in action S23 falls within a predetermined range of the reference voltage.

In action S25, when it is determined in action S24 that the voltage difference does not fall within the predetermined error range, the laser beam power is decreased if the voltage difference is a positive (+) value, and increased if the voltage difference is a negative (−) value. After adjustment of the laser beam power, the method is performed again starting from action S22. If it is determined in action S24 that the voltage difference falls within the predetermined range, action S30 is performed.

In action S30, a print job, which includes a charging process, an exposure process, a developing process, and a transferring process, is carried out.

In the method according to an embodiment of the present invention, the consumption of a developer used in an electrophotographic process can be reduced by adjusting the power of a laser beam to be identical with the density of an output image set in the electrophotographic processor, thereby adjusting an electric potential between an image region and a non-image region of a latent electrostatic image.

Figure 4:
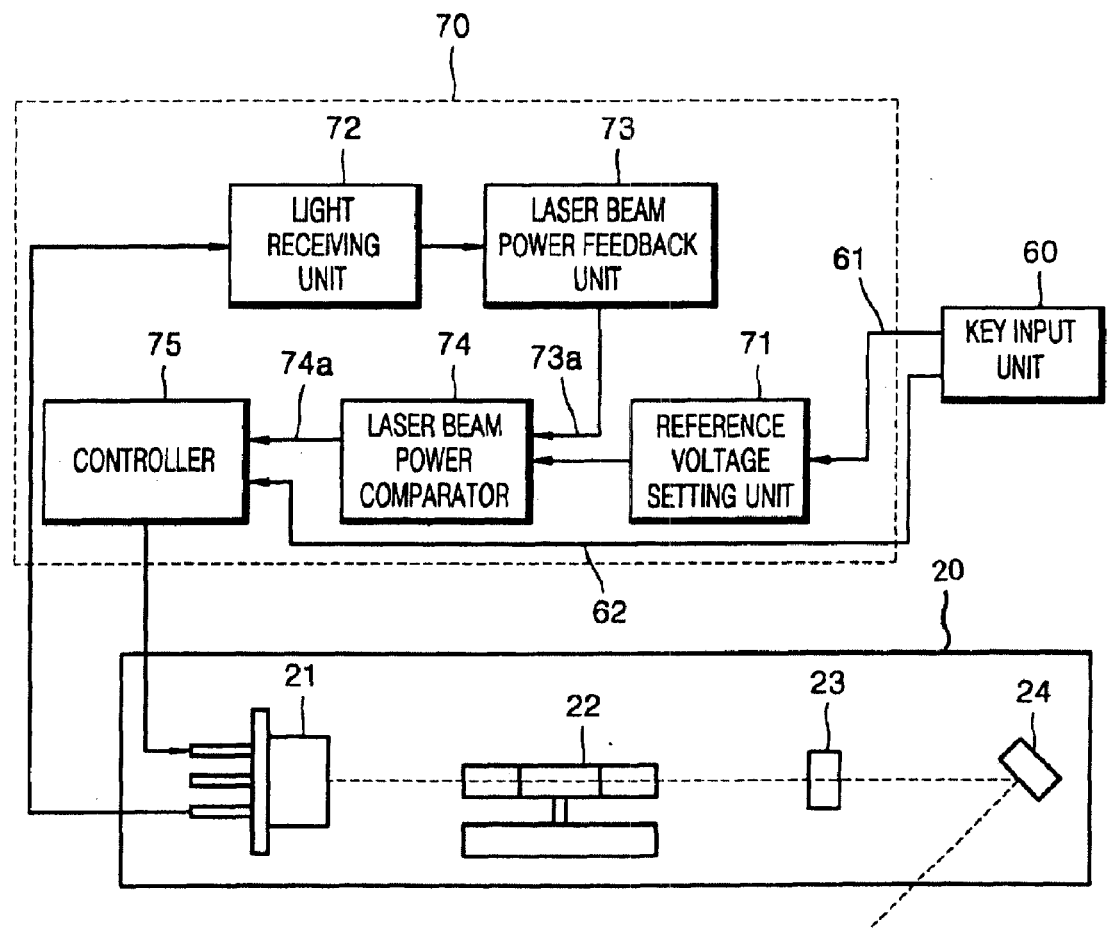
FIG. 4 is a diagram of an electrophotographic processor performing the method of FIG. 3.
Figure 4:
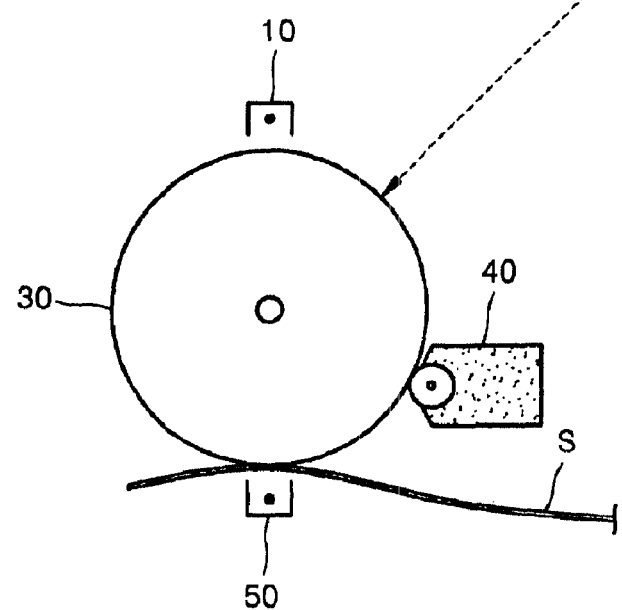

FIG. 4 is a diagram of an electrophotographic processor performing the method of FIG. 3. Referring to FIG. 4, the electrophotographic processor includes a charging unit 10, a laser exposure unit 20 having a laser diode for radiating a laser beam according to print data, a photosensitive object 30, a developing unit 40, a transferring unit 50, a key input unit 60, and a laser beam power control unit 70.

The laser exposure unit 20 includes a polygonal mirror 22, an f-θ lens 23, a reflector 24, and a laser beam outputting unit 21. In detail, the polygonal mirror 22, which is also called a polygonal rotating mirror, scans a laser beam, which forms a point of light, on a photosensitive object at equiangular velocity, according to a deflection principle of a rotating mirror. The f-θ lens 23 focuses the laser beam on a certain point of the photosensitive object and alters the laser beam, which is scanned at the equiangular velocity using the polygonal mirror, at equiangular velocity. The reflector 24 changes an optical path so that less space is required.

The laser beam outputting unit 21 includes the laser diode (LD), an LD control circuit, and a collimation lens, and outputs a laser beam, which has a predetermined power and a predetermined pulse width, to form as a point of light in response to print data input from the outside. The power of the output laser beam changes even with constant input current due to changes in ambient temperature surrounding the LD, according to the thermal characteristics of the LD. To maintain this temperature dependent change in the power of the laser beam within a predetermined tolerance range, the laser beam outputting unit 21 performs automatic beam power control (APC) that monitors feedback of the laser beam.

The key input unit 60 is manipulated by a user to output a signal 61 for setting the density of an image (hereinafter referred to as 'density set signal 61') and a print instruction signal 62.

Referring to FIG. 4, the laser beam power control unit 70 includes a reference voltage setting unit 71, a light receiving unit 72, a laser beam power feedback unit 73, a laser beam power comparator 74, and a controller 75.

The reference voltage setting unit 71 outputs a reference voltage for feedback control of the laser beam power, in response to the density set signal 61. The reference voltage setting unit 71 may be embodied as a digital-to-analog (D/A) converter that outputs a reference current in response to the input density set signal 61 having a predetermined number of bits. The reference voltage for feedback control of the laser beam power, which corresponds to the density set signal 61, can be obtained by combining a predetermined resistance with the reference current output from the D/A converter.

The light receiving unit 72 is a photoelectric converter, such as a photodiode, that performs photoelectric conversion on a radiated laser beam and outputs an electric current corresponding to the intensity of the laser beam. The light receiving unit 72 may be connected to the LD of the laser outputting unit 21.

The laser beam power feedback unit 73, provided with an electric current from the light receiving unit 72, converts the electric current into voltage using an OP amplifier and resistance capacitors, and outputs the voltage as voltage 73a that corresponds to the power of the laser beam.

In response to the print instruction signal 62 and the laser beam power comparing signal 74a, the controller 75 checks whether the laser beam power comparing signal 74a falls within a predetermined tolerance error range of the power of the laser beam. Then, the controller 75 adjusts the electric current to be supplied to the LD such that the power of the laser beam is increased when the laser beam power comparing signal 74a is a positive (+) value, and is decreased when this signal is a negative (−) value, and outputs the adjusted electric current to the laser exposure unit 20.

As described above, using the method of reducing consumption of a developer used in an electrophotographic processor and the electrophotographic processor performing the method, according to an embodiment of the present invention, consumption of a developer can be reduced without polluting a non-image region of a latent electrostatic image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of reducing consumption of a developer used in an electrophotographic processor that forms a latent electrostatic image on a charged photosensitive object using a laser exposure unit for outputting a laser beam, the method comprising:
   adjusting a power of the laser beam to match a user-selected density of an output image so as to adjust an electric potential between an image region and a non-image region of the latent electrostatic image;
   wherein the consumption of the developer is reduced.

2. The method of claim 1, comprising:
   continuously determining whether a print job is instructed from outside;
   adjusting the power of the laser beam using feedback control to match the density of the output image in the electrophotographic processor, in response to determining that the print job is instructed from the outside; and performing the print job.

3. The method of claim 2, wherein the adjusting the power of the laser beam comprises:
   setting a reference voltage for the feedback control based on the density of the output image;
   converting the power of the output laser beam into a feedback voltage;
   comparing the feedback voltage with the reference voltage, and measuring a difference between the feedback voltage and the reference voltage;
   determining whether the measured difference between the feedback voltage and the reference voltage falls within a predetermined tolerance error range; and
   adjusting the power of the laser beam in response to the measured voltage difference not falling within the predetermined tolerance error range, wherein the power of the laser beam is decreased in response to the feedback voltage being more than the reference voltage, and the power of the laser beam is increased in response to the feedback voltage being less than the reference voltage;
   wherein the converting the power of the output laser beam into the feedback voltage, comparing the feedback voltage with the reference voltage, determining whether the measured difference between the feedback voltage and reference voltage falls within the predetermined tolerance error range, and adjusting the power in response to the measured voltage difference are repeated until the measured difference falls within the predetermined tolerance error range.

4. An electrophotographic processor that is manipulated by a user to output a density set signal of an image and a print instruction signal; and
   a laser beam power control unit controlling power of the radiated laser beam, through feedback of the power, in response to the print instruction signal and the density set signal.

5. The electrophotographic processor of claim 4, wherein the laser beam power control unit comprises:
   a reference voltage setting unit outputting a reference voltage for the feedback control of the power of the laser beam in response to the density set signal;
   a light receiving unit receiving the radiated laser beam and outputting an electric current corresponding to an intensity of the laser beam;
   a laser beam power feedback unit receiving the electric current output from the light receiving unit, converting the electric current into feedback voltage, and outputting the feedback voltage;
   a laser beam power comparing unit comparing the reference voltage with the feedback voltage, and outputting the comparison result as a laser beam power comparing signal; and
   a controller determining whether the laser beam power comparing signal falls within a predetermined tolerance error range of the power of the laser beam, and adjusting the power of the laser beam in response to the laser beam power comparing signal not falling within the predetermined tolerance error range.

6. The electrophotographic processor of claim 5, wherein the reference voltage setting unit comprises a digital-to-analog (D/A) converter outputting the reference voltage in response to the density set signal.

7. The electrophotographic processor of claim 5, wherein in response to the laser beam power comparing signal not falling within the predetermined tolerance error range, the controller increases the laser beam power in response to the laser beam power comparing signal indicating the feedback voltage is lower than the reference voltage, and decreases the laser beam power in response to the laser beam power comparing signal indicating the feedback voltage is higher than the reference voltage.

8. A method of reducing consumption of a developer used in an electrophotographic processor with a laser exposure unit, the method comprising:

setting a reference signal corresponding to a desired printing density;

sampling a power of the laser exposure unit as a feedback signal;

comparing the reference signal to the feedback signal; and adjusting the power of the laser exposure unit so that the feedback signal approximates the reference signal.

9. The method of claim 8, wherein the power of the laser exposure unit is increased in response to the feedback signal being lower than the reference signal, and the power of the laser exposure unit is decreased in response to the feedback signal being higher than the reference signal.

10. An electrophotographic processor having a laser exposure unit, comprising:

a laser beam power control unit sampling a power of a laser beam output by the laser exposure unit as a feedback signal, comparing the feedback signal to a predetermined reference signal, and adjusting the power of the laser beam according to the feedback signal;

wherein the reference signal corresponds to a desired printing density, and the power of the laser beam is adjusted to approximate the desired printing density; and wherein the laser beam power control unit comprises:

a reference signal setting unit setting the reference signal corresponding to the desired printing density, and outputting the reference signal;

a light receiving unit photoelectrically converting the laser beam and outputting an electric current corresponding to the power of the laser beam;

a laser beam power feedback unit converting the electric current to a feedback signal;

a laser beam power comparison unit comparing the feedback signal with the reference signal, and outputting a comparison signal; and a controller adjusting the power of the laser beam in response to the feedback signal being outside a predetermined error range of the reference signal.

11. The electrophotographic processor of claim 10, further comprising a key input unit to input the desired printing density.

* * * * *